June 17, 1952 R. J. KORNER 2,600,886
CHAIR OR SEAT
Filed May 15, 1946 2 SHEETS—SHEET 1
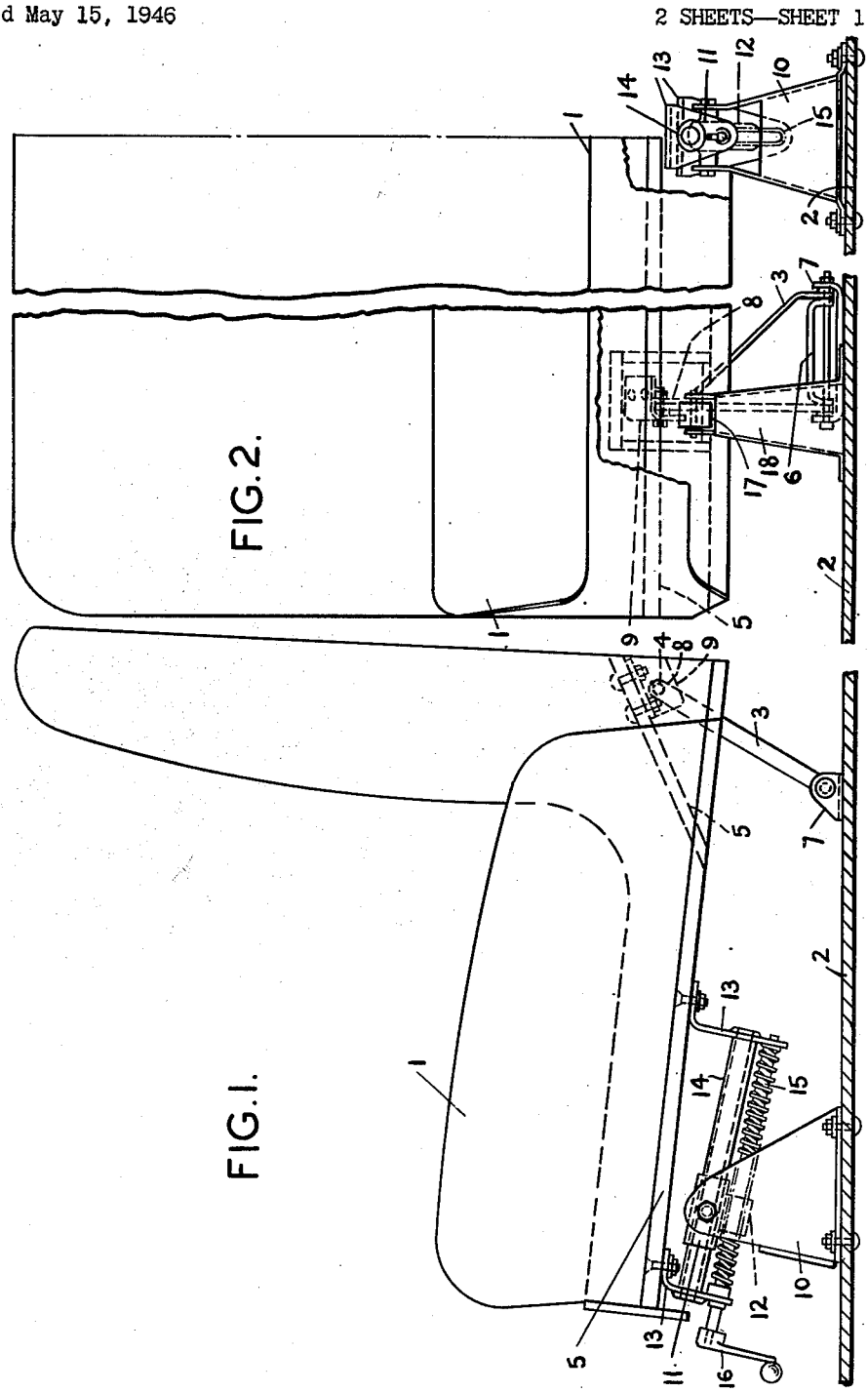
INVENTOR:
REGINALD JOHN KORNER
By Francis E. Boyce
ATTORNEY June 17, 1952  R. J. KORNER  2,600,886
CHAIR OR SEAT
Filed May 15, 1946  2 SHEETS—SHEET 2
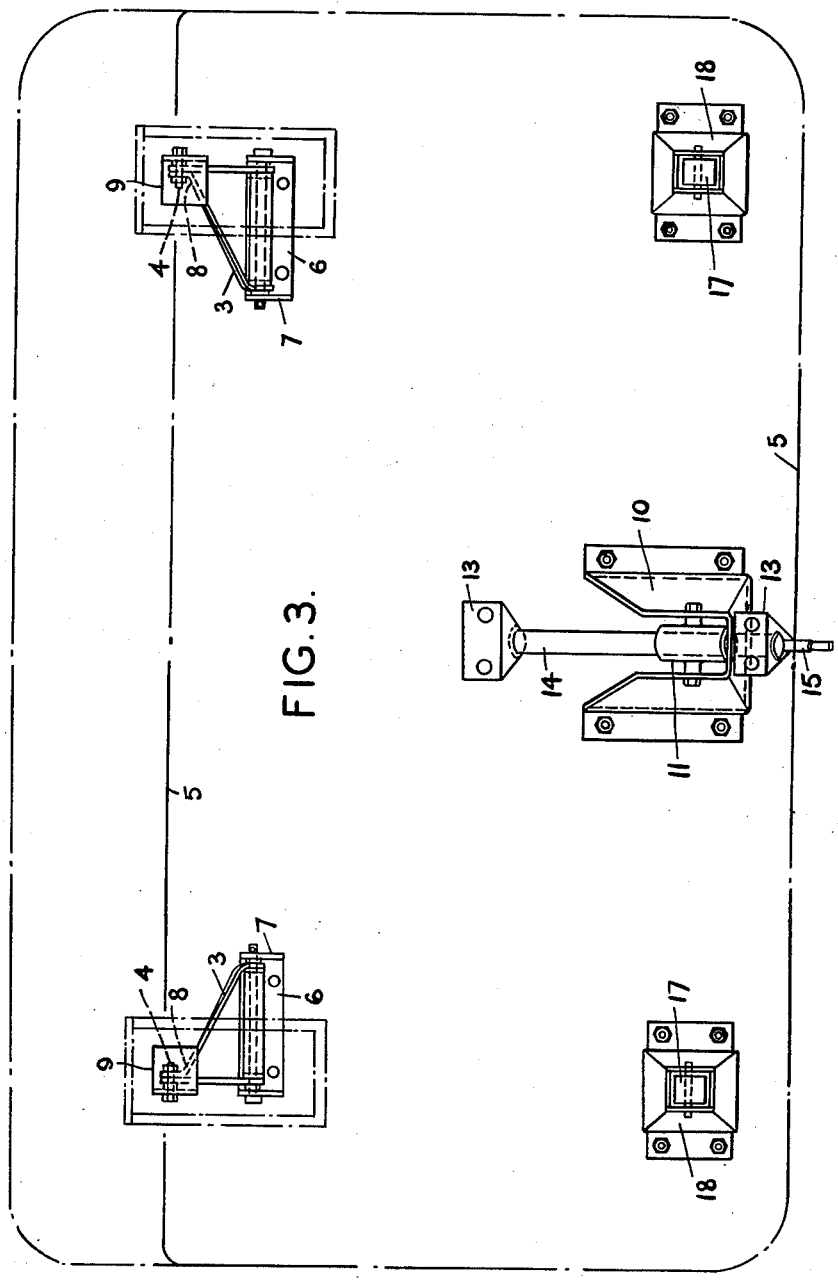
INVENTOR:
REGINALD JOHN KORNER
BY Francis E. Boyce
ATTORNEY Patented June 17, 1952

2,600,886

UNITED STATES PATENT OFFICE 2,600,886

CHAIR OR SEAT

Reginald John Korner, Bradford, England, assignor of one-half to Jowett Cars Limited, Bradford, England, a British company Application May 15, 1946, Serial No. 669,915
In Great Britain December 18, 1945

3 Claims. (Cl. 155—14)

This invention relates to chairs or seats for use in motor vehicles or other purposes where a seat adjustable in both horizontal and vertical planes is required.

Hitherto such seats have been constructed utilising links for supporting the seat frame to the floor or floor base at either or both the front and rear ends of the seat and having a screw adjustment for adjusting the seat in a horizontal plane and said screw adjustment in association with the links also effecting a raising and lowering of the rear of the seat in a vertical and horizontal plane. With all adjustable seats, particularly seats for motor vehicles it is essential that when adjusting the seat the latter should move in a straight line and there should be no twisting of the seat as this results in the seat jamming.

One object of the invention is to provide a new or improved construction of seat mounting that will obviate the aforesaid disadvantages.

A further object is to provide a new method of adjustment of the seat in both horizontal and vertical planes, that will obviate the aforesaid disadvantages.

A still further object is to provide a new or improved construction of seat mounting, particularly a full width seat for a motor vehicle which will be easy and efficient in adjustment.

One feature of the invention resides in the provision of a seat having a three point mounting relative to the floor or base, comprising two spaced supports at the rear permitting forward and backward movement of the seat frame but not lateral movement and a central forwardly placed adjusting or control mechanism which also affords the third point of mounting with no lateral movement. The rear supports may each comprise triangular pivotal brackets or links secured to the seat or seat frame at their apices and their bases or wider portions to suitable brackets secured to the floor or base. The forward central mounting may comprise a hand operated screw mechanism secured to the seat and adapted to co-operate with a screwed nut pivotally mounted in a suitable bracket secured to the floor or base.

The screw mechanism is set at an angle but axially in line with the center of the seat and direction of adjustment. On operation of the screw operated mechanism the seat moves forward or backwards according to the direction or rotation, the angle of the screw mechanism with the seat frame controlling the raising and lowering of the front end of the seat, and the rear links or brackets controlling the raising and lowering of the rear end of the seat and also the inclination of the back cushion. The raising and lowering of the rear of the seat and its resultant effects on the front screw adjusting mechanism is absorbed by the pivotal mounting of the co-operating nut. Associated with the nut there may be a bush through which slides a guide rod above the adjusting screw in order to further stabilise the seat and prevent lateral or twisting movement.

It will be appreciated that by providing rear mountings of triangular link form and a simple centrally disposed forward adjusting mounting a straight pull for adjustment is afforded and both the front and rear mountings do not permit of any twisting or movement of one side of the seat in advance of the other side of the seat which causes jamming.

If desired, the forward edge of the seat may be supported by a pair of spaced rollers which simply act as supports but are in no way attachments for securing the seat to the floor or base.

In order that the invention may be clearly understood and readily carried into effect the same will now be more fully described with reference to and by aid of the accompanying drawings, in which:

Figure 1 is a side elevation of a full width seat constructed and mounted in accordance with the invention;

Figure 2 is a half front elevation of Figure 1; and

Figure 3 is a plan view showing the disposition of the three point mounting and central adjusting mechanism.

Referring to the drawings the seat 1 has a three point mounting to the floor 2 of the vehicle (not shown). At the rear of the seat 1 are a pair of spaced links 3 pivotally attached at 4 to the seat frame 5 and to the floor 2 of the vehicle. Each link 3 is in the form of a triangular bracket having its base or widest part 6 pivotally secured to a bracket 7 so that its axis of rotation lies across the vehicle thus allowing the link 3 to pivot forward and backward in line with the direction of adjustment of the seat but not allowing any lateral movement or side play. The apex or top 8 of the triangular bracket is pivotally secured to the seat or seat frame 5 by a bracket or angle piece 9 provided thereon.

The forward mounting of the seat is centrally placed relative to the rear mountings and comprises a bracket 10 rigidly secured to the floor 2 having at its upper end a pivotally mounted trunnion or bush 11 which has associated there-with a screw nut 12. Attached to the seat or seat frame 5 are a pair of brackets 13 in line with the direction of movement of the seat and carrying a guide rod 14 also in line aforesaid but at an angle to the level of the underside of the seat or seat frame 5. The guide rod 14 passes through the trunnion or bush 11 and a rotatable screwed rod 15 is carried beneath the said guide rod 14 to engage and pass through the screwed nut 12. The rotable screwed rod 15 is adapted to be actuated by means of a handle 16 preferably situated beneath the front of the seat or seat frame.

If necessary or desirable additional supports may be provided at the forward corners of the seat comprising simple rollers 17 adapted to either engage the underside of the seat or seat frame 5 as shown or floor 2 according to whether they are mounted on the floor 2 (see Figure 2) or the seat or seat frame 5. These additional supports may comprise brackets 18 secured to the floor and carry the rollers 17 at their upper ends to engage the seat or seat frame 5.

In operation the actuation of the front adjusting mechanism causes forward and backward movement of the seat and raising and lowering of the front end of the seat whilst at the same time the seat brackets or links 3 raise and lower the rear part of the seat 1 which pivots about the front mountings in a vertical plane.

Whilst the invention has been described with reference to full width seats it will be understood that it can be readily applied to smaller or bucket type seats for motor vehicles or automobiles.

What I claim as my invention, and desire to secure by Letters Patent, is:

1. An adjustable seat, comprising a base member, a seat frame, and means for supporting said frame for movement in horizontal and vertical planes on said base member, said supporting means comprising a pair of triangular link members each pivoted at its apex to the seat frame at the rear thereof and having its base pivoted on the base member in crosswise relation to the seat frame, the side forming the hypotenuse of each of said triangular links serving to resist lateral movement of the seat frame, and a front supporting member secured to said seat frame centrally of the width thereof, said front supporting member being pivotally secured to said base member, and means carried by said front supporting member for controlling the movements of the seat frame on its supports, said controlling means including a manually operable screw carried by the seat frame and a nut threaded on said screw and pivotally supported on the base member.

2. An adjustable seat, comprising a base member, a seat frame, and means for supporting said frame for movement in horizontal and vertical planes on said base-member, said supporting means comprising a pair of members pivotally connected at one end thereof to said frame at the rear thereof, said members being spaced apart laterally of the frame and each having at its opposite end a portion extending laterally of the seat frame and pivotally connected to the base member thereby to resist lateral movement of the seat frame while permitting forward and backward movement thereof relative to the base member, and a front supporting member secured to said seat frame and disposed centrally of the width thereof, said front member being pivotally connected to said base member and means carried by said front supporting member for controlling the movements of the seat frame on its supports, said front supporting member comprising a bracket secured beneath the seat frame and said controlling means comprising a manually operable screw mounted for rotation in said bracket, said bracket and screw being movable with the seat frame, a bracket secured to and extending upward from said base member and a nut threaded on said screw and having trunnions pivotally mounted in said base member bracket.

3. An adjustable seat as set forth in claim 1, said front supporting member comprising a bracket secured beneath the seat frame and said controlling means comprising a manually operable screw mounted for rotation in said bracket, said bracket and screw being movable with the seat frame, a bracket secured to and extending upward from said base member and a nut threaded on said screw and having trunnions pivotally mounted in said base member bracket.

REGINALD JOHN KORNER.

REFERENCES CITED

The following references are of record in the file of this patent:

UNITED STATES PATENTS

| Number | Name | Date |
|---|---|---|
| 231,438 | Mellinger et al. | Aug. 24, 1880 |
| 247,871 | Anderson | Oct. 4, 1881 |
| 1,684,944 | Chapman | Sept. 18, 1928 |
| 1,784,241 | Marshall et al. | Dec. 9, 1930 |
| 1,916,346 | Toncray et al. | July 4, 1933 |
| 1,934,893 | Thomas | Nov. 14, 1933 |
| 1,987,431 | Browne | Jan. 8, 1935 |
| 2,272,536 | Votypka | Feb. 10, 1942 |
| 2,345,182 | Corber | Mar. 28, 1944 |

FOREIGN PATENTS

| Number | Country | Date |
|---|---|---|
| 173,345 | Switzerland | Nov. 30, 1934 |
| 551,808 | Great Britain | Mar. 10, 1943 |